United States Patent [11] 3,571,786

[72] Inventors Donald Mureay Saling;
Edward L. Benson, Poughkeepsie, N.Y.
[21] Appl. No. 155,867
[22] Filed Nov. 29, 1961
[45] Patented Mar. 23, 1971
[73] Assignee The United States of America as represented by the Secretary of the Navy

[54] GRAPHIC RECORDING SYSTEM
10 Claims, 6 Drawing Figs.
[52] U.S. Cl. .................................................. 340/2,
340/3-F, 346/33-EC
[51] Int. Cl. .................................................. G01s 9/66,
G01d 9/00
[50] Field of Search ........................................ 346/33, 33
(EC), 33 (RAD), 44, 49; 235/186, 187; 340/2, 3, 3
(R), 5, 6; 343/103, 15; 343/5, 5 (PR), 112, 113

[56] References Cited
UNITED STATES PATENTS
3,119,090 1/1964 Springer .................... 340/2

Primary Examiner—Richard A. Farley
Attorneys—Q. B. Warner and Henry Hansen

CLAIM: In a sonobuoy data processing system including a two stylus moving strip chart recorder having the stylus actuating mechanisms thereof coupled to the output circuits of a two channel sonobuoy receiving system, readout and computing apparatus comprising: a first mechanical cursor mounted on said recorder to span said strip chart for sliding movement therealong, second and third mechanical cursors each mounted on said recorder to span a portion of said chart for sliding movement therealong with respect to said first cursor, first and second electromechanical transducing means, means applying energizing voltages proportional to the velocity of sound in water to said transducing means, means mechanically coupling said first transducing means to said first and second cursors whereby said first transducing means provides an output voltage which varies in accordance with the displacement between said first and second cursors, means mechanically coupling said second transducing means to said first and third cursors whereby said second transducing means provides an output voltage which varies in accordance with the displacement between said first and third cursors, first and second output terminal means, and circuit means respectively coupling the output voltages of said first and second transducing means to said first and second output terminal means.

INVENTORS
DONALD M. SALING
EDWARD L. BENSON
ATTORNEY

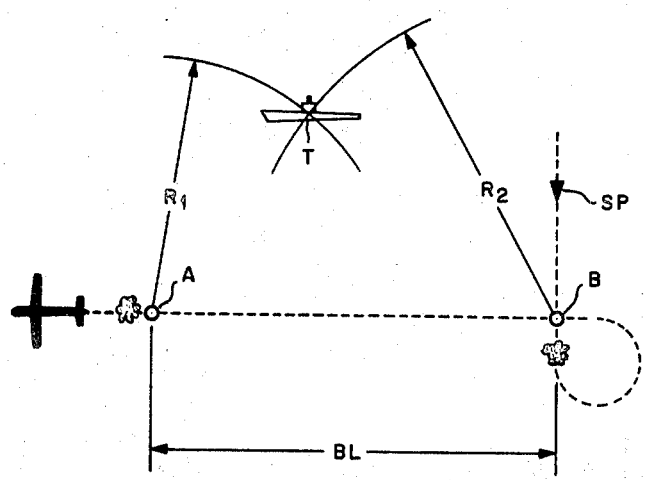
Fig. 2a
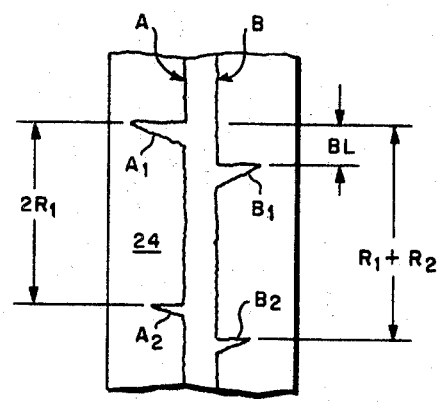
Fig. 3a
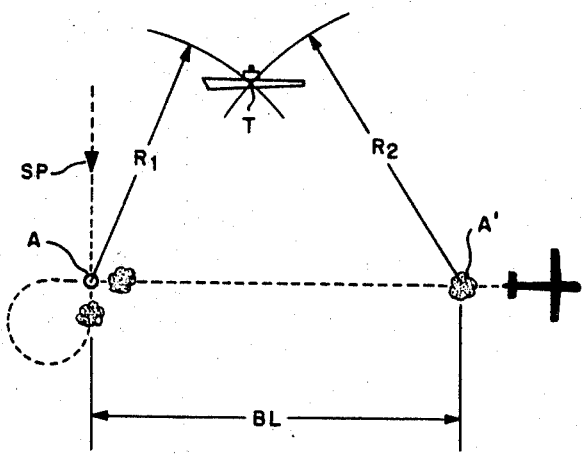
Fig. 2b
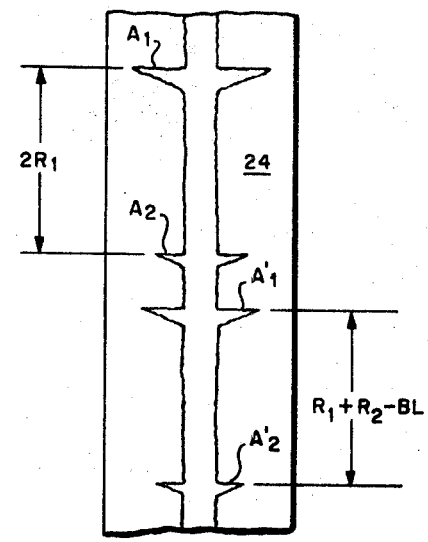
Fig. 3b
INVENTORS
DONALD M. SALING
BY  EDWARD L. BENSON
ATTORNEY

INVENTORS
DONALD M. SALING
EDWARD L. BENSON

GRAPHIC RECORDING SYSTEM

The present invention relates generally to graphic recording systems and more particularly to a graphic recording, readout, and computing system for use with explosive echo ranging systems.

Explosive echo ranging techniques have been developed to enhance the probability of success in airborne search, detection, and localization of submarines. One such technique, known as JULIE, involves the use of air dropped passive sonobuoys and explosive charges.

A passive sonobuoy is a device comprising a float containing a radio transmitter having the radio frequency portion thereof coupled to an antenna mounted on the float, and the modulating portion thereof coupled to a hydrophone suspended from the float. Elastic waves impinging upon the hydrophone generate corresponding electrical potentials therein, and the sonobuoy transmitter thereupon functions to broadcast radio frequency signals which may be varied in phase, frequency, or amplitude to thereby indicate the characteristics of the elastic waves.

In practicing the JULIE technique, a patrol aircraft searching for a submarine target drops a pattern of sonobuoys around the area of a suspected target location. An explosive charge is dropped near one or more sonobuoys. If the explosive wave strikes an underwater target, a part of the energy thereof is reflected and the echo signal is detected by the hydrophone, the direct wave having been previously detected thereby. The direct and echo signals are transmitted to the patrol aircraft where they are received by a sonobuoy receiving system in the aircraft. A recorder coupled to the receiving system presents the direct and echo signals to the JULIE operator in graphic form. By skillful and meticulous interpretation of the recorder presentation, the JULIE operator may determine the approximate range between the target and each of a plurality of sonobuoys. This information may be orally communicated via the aircraft intercommunication system to a tactical navigator or other crew member who may construct a target plot from which the location, course, and speed of the submarine may be determined with respect to the locations of the sonobuoys and with respect to the location, course, and speed of the patrol aircraft. When provided with this information, the pilot may maneuver the aircraft into a position where an attack on the target may be accomplished.

From the above description, it will be apparent that in utilizing prior art systems not only is undue reliance placed upon the interpretative abilities of the JULIE operator, but also that the procedures required to be employed are cumbersome, time-consuming, and fraught with possibilities of error.

The present invention seeks to minimize the disadvantages inherent in prior art systems by providing a graphic recording, read-out, and computing system which permits the interpretative functions of the JULIE operator to be greatly reduced, and which provides for storage and automatic, selective transmission of range data to the tactical navigator or other crew member.

Briefly, there is provided a two channel moving strip chart recorder with the pen actuating mechanisms thereof coupled to the sonobuoy receiving system. Direct and echo mechanical cursors are associated with the strip chart and are coupled to electromechanical transducing means whereby electrical signals are provided which correspond to the placement of the cursors with respect to hydrophone signals recorded on the chart. A computing system energized by the cursor signals provides range data which may be coupled by synchro data links to digital counters in a remote range indicator located, for example, at the tactical navigator's station. Digital counters in a range indicator located at the JULIE operator's station may be concurrently actuated. Means are provided whereby range data may be stored and presented for acknowledgment at the remote indicator at the option of the JULIE operator.

It is therefore an object of the present invention to provide an improved graphic recording system particularly adapted for use with explosive echo ranging systems.

It is another object of the present invention to provide a graphic recording, read-out, and computing system for use with explosive echo ranging systems.

It is still another object of the present invention to provide a graphic recording system for use with explosive echo ranging systems which when contrasted with prior art systems provides a greater probability of success in the airborne search, detection, and localization of submarine targets.

Other objects and many of the attendant advantages of this invention will be readily appreciated as the same become better understood by reference to the following detailed description when considered in connection with the accompanying drawings wherein:

FIG. 1 in block diagram form shows a portion of the recording system of the present invention coupled to a sonobuoy receiving system;

FIGS. 2a and 2b illustrate two tactical techniques, in the practice of which embodiments of the invention may be advantageously employed;

FIGS. 3a and 3b illustrate strip chart recordings obtained when the techniques illustrated in FIGS. 2a and 2b are practiced.

Figure 1:
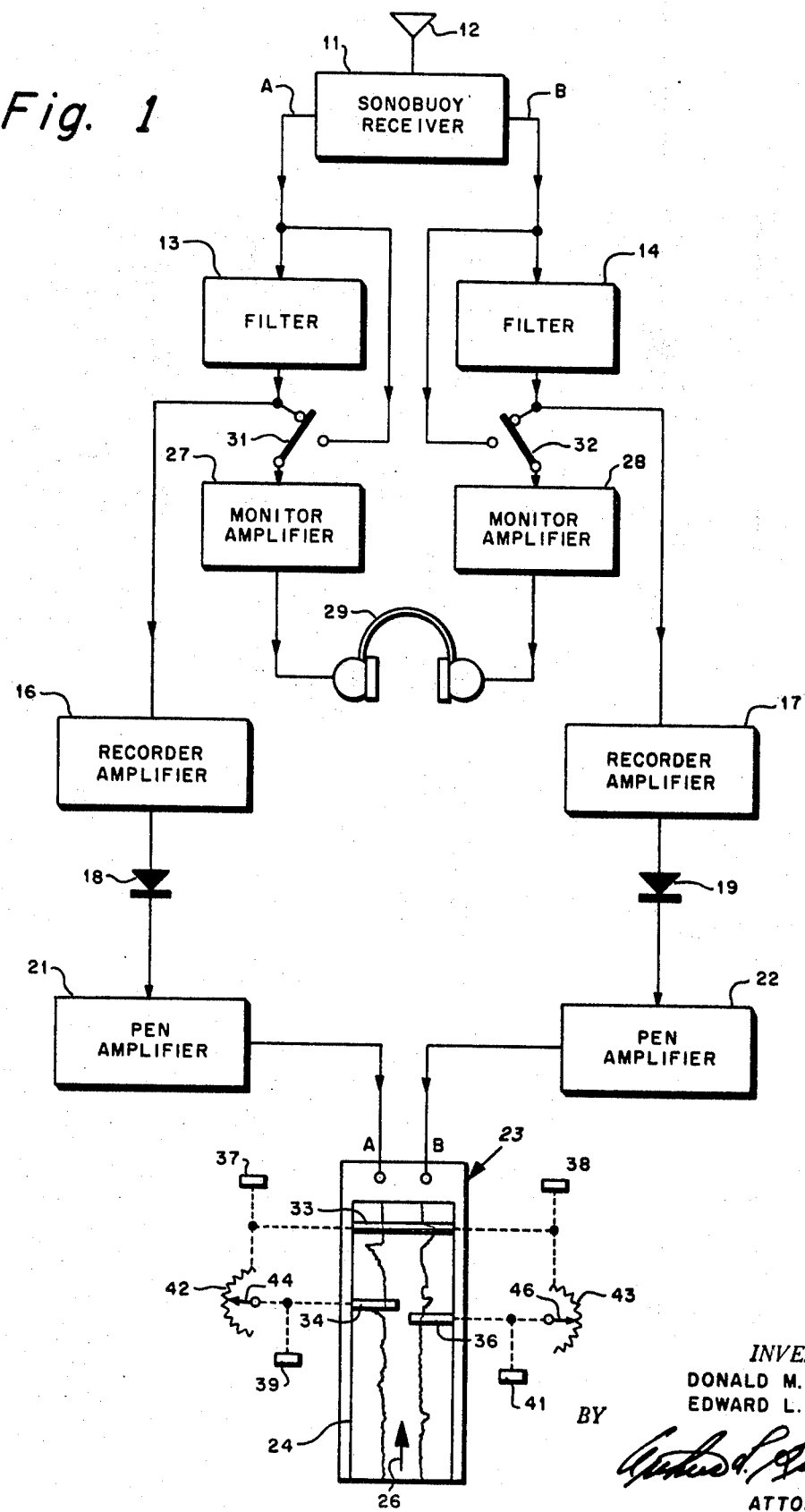

Referring now to FIG. 1, there is shown a two channel sonobuoy receiver 11 coupled to a receiving antenna 12 to receive hydrophone signals from one or a selected pair of air dropped sonobuoys. The channels of the sonobuoy receiver are herein designated channel A and channel B.

The receiver output signals, appearing at channels A and B thereof, are respectively coupled through filter circuits 13, 14, recorder amplifiers 16, 17 rectifiers 18, 19, and pen amplifiers 21, 22, and are coupled to a pair of pen actuating mechanisms (not shown) of a moving strip chart recorder 23.

It will be understood that application of hydrophone signals to the pen actuating mechanisms causes a pair of pens (not shown) mounted in recorder 23 to be translated transversely of the path of motion of a strip chart 24 mounted thereon. The path of motion of the strip chart is indicated in FIG. 1 by an arrow 26.

Filter circuits 13, 14 include high and low pass channels and are provided in order to improve the quality of hydrophone signals recorded respectively in shallow and deep water operation while rectifiers 18, 19 may be provided if the pen actuating mechanisms are of the galvanometer type. While not shown, it is to be understood that the recorder and pen amplifiers may be provided with manually operable gain controls.

In order to aid the JULIE operator in discriminating between direct or echo signals and bottom returns, aural monitoring circuits may be provided comprising a pair of monitor amplifiers 27, 28 coupled to a biaural headset 29. The input circuits of monitor amplifiers 27, 28 may be coupled through a pair of manually operable switching means 31, 32 either to filter circuits 13, 14 or directly to channels A and B of sonobuoy receiver 11. The filter bypass circuit is provided since in some operating environments, the JULIE operator may have difficulty in aurally detecting echo signals after they have been filtered.

Referring again to recorder 23, in addition to the structure described above there is provided a mechanical cursor 33 spanning the width of strip chart 24 and a pair of mechanical cursors 34, 36 each spanning slightly less than half the width of the strip chart. Cursors 33, 34, and 36, which may be plastic, are mounted for sliding movement along the length of strip chart 24. Translation of cursor 33 is accomplished by conjoint actuation of a pair of knobs 37, 38 while cursors 34, 36 are respectively translated by manipulation of knobs 39, 41. Manipulation of knobs 37, 38 in addition to translating cursor 33 functions to position the resistive portions 42, 43 of a pair of precision potentiometers with respect to the wiper arms 44, 46 thereof while manipulation of knobs 39, 41 in addition to translating cursors 34, 36 functions to position wiper arms 44, 46 with respect to resistive portions 42, 43. Thus, at all times wiper arms 44, 46 are positioned to select that portion of resistors 42, 43 corresponding to the displacements between cursor 33 and cursors 34, 36, respectively.

Cursor 33 is hereinafter referred to as the direct cursor, while cursors 34, 36 are referred to as echo cursors.

Since the mechanical details of the cursor and potentiometer structures may be conventional they have been omitted from the drawings for simplicity.

Before proceeding with a description of the embodiment of the invention illustrated in FIG. 4, reference will be made to the tactical technique diagrams of FIGS. 2a, 2b and to the corresponding strip chart presentations illustrated in FIGS. 3a, 3b in order to explain the significance of the cursor displacements and corresponding potentiometer settings.

Referring now to FIG. 2a, which illustrates a two sonobuoy, single explosive charge localization technique, a patrol aircraft is directed in a search pattern circumscribing the area of a suspected target, as indicated by the arrow SP. Periodically sonobuoys, such as sonobuoy B, are dropped and immediately thereafter an explosive charge is dropped. When a target is detected, as indicated aurally in headphones 29 and visually by the presentation being recorded on chart 24, the aircraft is turned and flown back across the location of sonobuoy B in the general direction of the suspected target. Sometime later a second sonobuoy, sonobuoy A, and a charge are dropped. At this time channels A and B of recorder 23 are connected to channels A and B of sonobuoy receiver 11. Almost immediately the direct wave is received and presented on channel A of the chart as indicated at $A_1$ in FIG. 3a. Sometime later the echo signal from the target is received and presented on chart 24 at $A_2$.

Since strip chart 24 is translated at a uniform rate, it will be apparent that the distance between chart presentations $A_1$, $A_2$ is proportional to twice the range, $R_1$, between sonobuoy A and the target.

Referring now to channel B of the chart presentation, a time after the charge has been dropped that is proportional to the base line distance, $BL$, between sonobuoys A and B, a direct wave is received at sonobuoy B and presented on chart 24 at $B_1$. After a further time proportional to the sum of the range between sonobuoy A and the target, $R_1$, and between the target and sonobuoy B, $R_2$, less the base line distance, the echo signal is received at sonobuoy B and presented at $B_2$ on chart 24. The distance between signal presentation $A_1$, $B_2$ is therefore proportional to $R_1 + R_2$, and the distance between signal presentation $A_1$, $B_1$, is proportional to $BL$, the base line distance.

If direct cursor 33 is positioned adjacent signal presentation $A_1$ and echo cursor 34 is positioned adjacent signal presentation $A_2$, the resistance picked off by wiper arm 44 will be proportional to twice the range between sonobuoy A and target.

Range $R_1$ equals $\frac{V_s \times T_1}{2}$, where $V_s$ is the velocity of sound in water, and $T_1$ represents the time between receipt of signals $A_1$, $A_2$ and is proportional to the distance between signal presentations $A_1$, $A_2$. If a voltage proportional to $\frac{V_s}{2}$ is applied to resistor 42, the voltage appearing at wiper 44 will be proportional to $R_1$. If at the same time echo cursor 36 is positioned adjacent signal presentation $B_2$, the wiper arm 46 will pick off a resistance proportional to the sum of $R_1$ and $R_2$. The sum of $R_1$ and $R_2$ is equal to $V_s T_2$, where $T_2$ represents the time between receipt of the direct wave on sonobuoy A and the echo on sonobuoy B and is proportional to the distance between signal presentations $A_1$, $B_2$. If a voltage proportional to $V_s$ is applied to resistor 43, the voltage appearing at wiper 46 will be proportional to $R_1 + R_2$. Range $R_2$ may be obtained by subtracting a voltage proportional to $R_1$ from the voltage appearing at wiper 46.

Should it be desired to employ recorder 23 to determine the spacing between sonobuoys A and B, direct cursor 33 may be positioned adjacent signal presentation $A_1$ and echo cursor 36 may be positioned adjacent signal presentation $B_1$. Potentiometer wiper 46 will thereupon be positioned to select a resistance proportional to the distance between the sonobuoys. A voltage proportional to $V_s$ may be applied to resistor 43 to obtain a voltage proportional to $BL$.

FIG. 2b illustrates a single sonobuoy, two charge method of localization while FIG. 3b illustrates the corresponding chart presentations. In practicing this technique, channels A and B of sonobuoy receiver 11 are tuned to the same frequency. FIG. 3b indicates that channel A has been selected. Assuming that a search pattern has been conducted, and that a target has been detected, as described above in connection with FIG. 2a, the aircraft is turned and flown across sonobuoy A in the general direction of the suspected target and an explosive charge is dropped close to sonobuoy A. Sometime later a second charge A' is dropped.

Referring to FIG. 3b, the direct wave from the first charge is received almost immediately and presented at $A_1$ on chart 24. Sometime later the echo signal associated with the first charge is received and presented on chart 24 at $A_2$. As before the distance between signal presentations $A_1$, $A_2$ is proportional to twice the range, $R_1$, between sonobuoy A and the target. Since both channels of the recorder are connected to the same sonobuoy receiver channel, the signal presentations on chart 24 are symmetrical on both channels thereof, but the presentations on channel B are ignored in determining $R_1$. If the distance between sonobuoy A and charge A' is relatively long with respect to the distance between sonobuoy A and the target, the direct wave from charge A' will be received at sonobuoy A and recorded at $A_1'$ on chart 24 after echo signal $A_2$ has been received and recorded. Sometime thereafter the echo signal from charge A' will be received at sonobuoy A and recorded at $A'_2$ on the chart. Operation of the invention will not be impaired should the direct wave from charge A' be received and presented prior to the time the first echo signal is received and presented.

Inspection of FIG. 2b will reveal that the distance between signal presentations $A_1'$ and $A'_2$ is proportional to the sum of $R_1$ and $R_2$ minus the base line distance between sonobuoy A and charge A'.

If direct cursor 33 is located adjacent signal $A_1$ and echo cursor 34 is located adjacent signal presentation $A_2$, the setting of potentiometer wiper 44 will be proportional to $R_1$. If now direct cursor 33 is translated to be adjacent signal presentation $A'_1$ and echo cursor 36 is positioned adjacent signal presentation $A'_2$ potentiometer wiper arm 46 will be positioned to select a resistance proportional to the sum of $R_1$ and $R_2$ minus the base line. The manner in which voltages proportional to $R_1$ and $R_2$ may be obtained is similar to that above described except that in practicing the single sonobuoy, two charge technique, it is necessary to obtain a voltage proportional to the base line distance for addition to the voltage proportional to the base line distance for addition to the voltage appearing at wiper 46 in order to obtain a voltage proportional to $R_2$.

It will be noted that, in order to establish the setting of potentiometer wiper arm 46, it is necessary to disturb the setting of wiper arm 44. Accordingly, as will be better understood by reference to FIG. 4, provision is made in embodiments of the invention to store the setting of potentiometer wiper arm 44 prior to resetting cursor 33 in order to establish the setting of wiper arm 46.

It may be desirable to stop the recorder while manipulating cursors 33, 34 to obtain range $R_1$ data and to restart the recorder just prior to receipt of the direct wave from charge A' in order to conserve chart paper and in order to permit the lengthwise dimension of recorder 23 to be maintained minimum.

Figure 4:
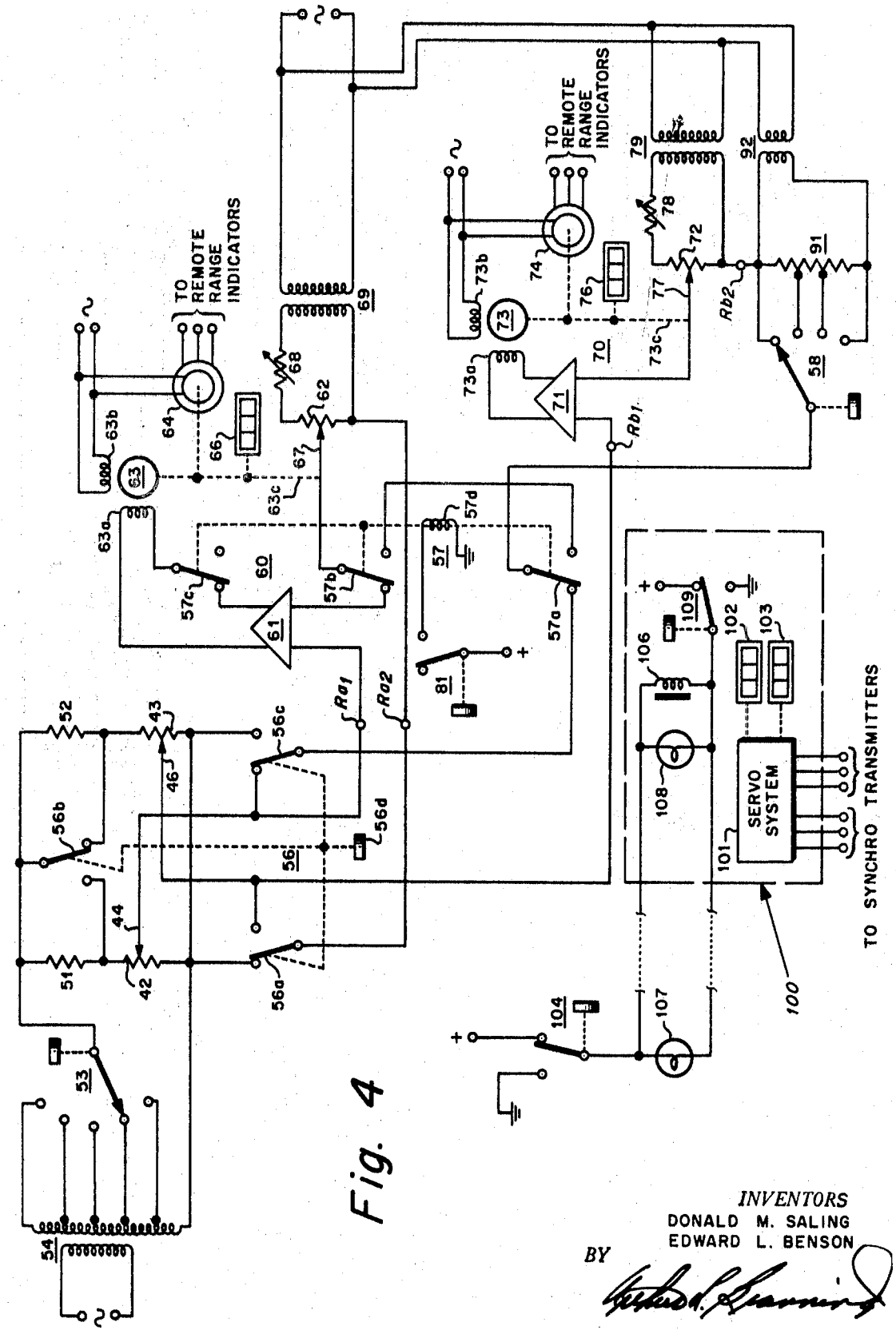
FIG. 4 in circuit and block diagram form shows an embodiment of the invention coupled to a remote range indicator.

As will be understood by reference to FIG. 4, provision is also made in embodiments of the invention to perform the indicated divisions, subtractions, and additions in order to obtain signals proportional to $R_1$ and $R_2$. The signals may be utilized to position digital counters in the JULIE operator's and in the tactical navigator's range indicators. The range data provided to the tactical navigator permits him to construct a target plot, if desired.

The initial description of the embodiment of the invention illustrated in FIG. 4 will be in terms of the two sonobuoy, single charge technique illustrated in FIGS. 2a, 3a.

Referring now to FIG. 4, potentiometer resistors 42, 43, are respectively coupled through computing resistors 51, 52, and a manually operable switching means 53 to the tapped secondary winding of a transformer 54, the primary winding of which is coupled to the aircraft's 400 cycle electrical system.

When a charge is dropped near sonobuoy A (FIG. 2a) the range $R_1$ between the sonobuoy and the target, as stated above, is equal to $\frac{V_s \times T_1}{2}$, where $V_s$ is the velocity of sound in water (assumed constant during a localization operation), and $T_1$ is the time between receipt of the direct wave and echo waves. Switching means 53 is actuated to select a voltage proportional to $V_s$ which is applied to the series combinations of computing resistors 51, 52 and potentiometer resistors 42, 43. Resistors 51, 52 have values equal to resistors 42, 43 in order to provide for division by two. The voltage appearing between wiper arm 44 and the common terminal of potentiometer resistors 42, 43 is therefore proportional to $R_1$ and is coupled through contact 56a of a manually operable switching means 56 to output terminals $R_{a1}$, $R_{a2}$ of the recorder.

The range $R_2$ between sonobuoy B and the target is equal to $V_s \times T_2 - R_1$ where, as before $V_s$ is equal to the velocity of sound in water, and $T_2$ is the time between receipt of the direct wave at sonobuoy A and the echo wave at sonobuoy B. Since division by two is not required in determining the range between sonobuoy B and the target, computing resistor 52 is shorted by contact 56b of switching means 56. The indicated subtraction is accomplished by coupling the voltages appearing between wiper arms 44, 46 and the common terminal of potentiometer resistors 42, 43 in opposition to recorder output terminals $R_{b1}$, $R_{b2}$.

The circuit coupling the potentiometer wiper voltages to recorder output terminals $R_{b1}$, $R_{b2}$ includes contact 56c of switching means 56, contact 57a of a relay 57, and a manually operable switching means 58. As will be described below, relay 57 and switching means 58 are employed when range determinations are made using the single sonobuoy, two charge localization technique.

In some cases it may be desirable to drop the charge adjacent sonobuoy B instead of adjacent sonobuoy A as above described. In this event, switching means 56 is operated by manipulation of knob 56d to actuate switch contact 56a, 56b and 56c to positions alternate to those shown in FIG. 4 thereby reversing the functions of potentiometers 42, 43.

In order to provide for actuation of digital counters in range indicators located at the JULIE operator's and at the tactical navigator's stations, a pair of servosystems generally indicated by reference numerals 60, 70 may be provided and coupled to be energized to recorder output terminals $R_{a1}$, $R_{a2}$, $R_{b1}$, and $R_{b2}$.

Servosystem 60 comprises a servoamplifier 61 having the input circuits thereof coupled to recorder output terminals $R_{a1}$, $R_{a2}$ through contact 57b of relay 57 and a feedback potentiometer 62. The output circuit of amplifier 61 is coupled through contact 57c of relay 57 to the control winding 63a of a two phase servomotor 63, the fixed phase winding 63b of which is coupled to be energized to the aircraft's 400 cycle electrical system. The shaft 63c of servo motor 63 is mechanically coupled conjointly to the rotor of a synchro transmitter 64 (the rotor winding of which is coupled to the aircraft's 400 cycle supply), to a digital counter 66 located in the JULIE operator's range indicator, and to the wiper arm 67 of feedback potentiometer 62, which is coupled to be energized through a calibrating resistor 68 to the secondary winding of a transformer 69. Operation of feedback resistor 62 is conventional. Accordingly when servosystem 60 is in equilibrium, a voltage equal to $R_1$ appears at wiper 67. As will be further described below, this voltage may be utilized in practicing the single sonobuoy, two charge technique. It will be apparent that the rotor of synchrotransmitter 64 and digital counter 66 are positioned in accordance with the position of shaft 63c which in turn is positioned in accordance with the magnitude of the range voltage appearing at recorder output terminals $R_{a1}$, $R_{a2}$.

Servosystem 70 comprises a servoamplifier 71 coupled to the control winding 73a of a two phase servomotor 73, provided with a fixed phase winding 73b and having the shaft 73c thereof coupled to the rotor of a synchrotransmitter 74, a digital counter 76, and wiper arm 77 of a feedback potentiometer 72 which is coupled through a calibrating resistor 78 to the secondary winding of a transformer 79. Since the mode of operation of servosystem 70 is identical to that of servosystem 60, it will not be further described.

As shown in FIG. 4, the primary windings of transformers, 69, 79 are connected to the aircraft's 400 cycle supply.

In practicing the single sonobuoy, two charge localization technique, illustrated in FIGS. 2b, 3b, operation of channel A of the system shown in FIG. 4 is identical to the mode of operation described above. Accordingly, in this mode of operation, a voltage proportional to range $R_1$ is coupled from potentiometer 42 and applied to servosystem 60 whereby digital counter 66 is actuated to display range $R_1$, the rotor of synchrotransmitter 64 is angularly positioned in accordance with the magnitude of $R_1$, and wiper 67 is positioned to select a voltage equal to $R_1$. During this part of the operation the results obtained on channel B of the system are ignored.

After range $R_1$ has been determined, the recorder may be restarted and a second charge A' dropped (FIG. 2b). The range, $R_2$, between charge A' and the target is equal to $V_s \times T_3 - R_1 + BL$, where $T_3$ is the time between the direct and echo waves received at the sonobuoy from charge A', $R_1$ is the range between the sonobuoy and the target, $BL$ is the base line distance between the sonobuoy and the second charge (which, in practicing this technique must be determined by operation of navigation equipment in the aircraft), and $V_s$ again is the velocity of sound in water.

As mentioned above, in determining range $R_2$ it is necessary to reposition direct cursor 33 thereby disturbing the setting of potentiometer resistor 42. Accordingly, before setting the cursors to permit determination of range $R_2$ it is necessary to store $R_1$ range data and at the same time to make a voltage proportional to $R_1$ available in order to permit subtraction thereof from the other quantities in the $R_2$ range equation. Range hold relay 57 is provided for this purpose.

Referring now again to FIG. 4, when it is desired to store $R_1$ range data, range hold switch 81 is actuated, energizing operating winding 57d of relay 57 whereupon contacts 57a, 57b, and 57c are operated to positions alternate to those shown in FIG. 4. Actuation of contacts 57a, 57b functions to couple the voltage appearing at potentiometer wiper 67, now proportional to $R_1$, to amplifier 71 in opposition to the voltage appearing at potentiometer wiper 46 in place of the voltage appearing at potentiometer wiper 44. Accordingly, the resetting of potentiometer 42 which occurs when direct cursor 33 is repositioned has no effect upon the computation of range $R_2$. It should be noted that during this operation switching means 56 is maintained in the condition shown in FIG. 4. At the same time actuation of contacts 57b, 57c functions to lock up servo 60 to thereby provide for the storage of $R_1$ range data and to maintain the positioning of wiper 67 of potentiometer 62.

In order to obtain a voltage proportional to the base line distance $BL$, as required in the $R_2$ range equation, a tapped resistor 91 is provided coupled across the secondary of a transformer 92 the primary winding of which is coupled to the aircraft's 400 cycle supply. Switch means 58 is actuated to select the portion of the voltage appearing across resistor 91 proportional to the base line distance as determined by reference to the aircraft's navigation system. As shown in FIG. 4, the base line voltage selected by switch means 58 is connected to amplifier to add to voltage appearing at wiper 46.

Summarizing, the voltage appearing on wiper arm 46 is proportional to $R_1 + R_2 - BL$ (FIG. 3b). The voltage appearing on potentiometer 62, proportional to $R_1$, is subtracted from the voltage appearing at wiper arm 46, while the voltage appearing at the selected portion of resistor 91, proportional to the base line distance, $BL$, is added thereto, to thereby apply a voltage proportional to $R_2$ to the output circuits of servoamplifier 71. Servosystem 70 thereupon functions to position counter 76 and the rotor of synchrotransmitter 74 in accordance with the magnitude of $R_2$.

In order to provide for remote range indication, for example at the tactical navigator's station, the stator voltages of synchrotransmitters 64, 74 are coupled through a synchrodata link, not shown, to a servosystem 101 in a remote range indicator 100 which functions to actuate digital counters 102, 103 in synchronism with actuation of digital counters 66, 76. Servosystem 101, together with amplifier systems, may comprise a pair of synchroreceivers (not shown) having the stators thereof coupled to the stators of synchrotransmitters 64, 74 and the rotors thereof mechanically coupled to counters 102, 103. Since such systems are conventional, servosystem 101 has not been shown in detail.

From the above description it will be apparent that during manipulation of cursors 33, 34, and 36 erroneous range indications will appear on counters 102, 103 (as well as on counters 66, 76). In order to avoid ambiguous indications, a signalling system is provided controlled jointly by the JULIE operator and the tactical navigator to indicate when range data is correct and when the tactical navigator has noted the data.

Referring again to FIG. 4, when the JULIE operator has concluded manipulation of the direct and echo cursors, a data transmit switch 104 is actuated energizing a shutter release solenoid 106, and a pair of indicating lamps 107, 108, respectively located at the JULIE operator's and at the tactical navigator's stations. When shutter solenoid 106 is energized a pair of shutters (not shown) are raised exposing the dials of counters 102, 103. When the tactical navigator has noted the range data, he actuates a switch 109 deenergizing solenoid 106 and lamps 107, 108 indicating to the JULIE operator that a new range computation may be made.

There has been disclosed above a graphic recording, read-out, and computing system which not only permits a reduction in the interpretive functions imposed upon the recorder operator when practicing explosive echo ranging techniques, but which also provides for selective computation, storage, and transmission of range data to a tactical navigator or other crew member, and which further includes means whereby the tactical navigator or other crew member may acknowledge receipt of range data.

Since the range data provided to the tactical navigator comprises the radii of intersecting circles wherein a target is located at one of the circle intersections, a target plot may be constructed by the tactical navigator whereby information may be provided to the pilot of the aircraft to aid him in maneuvering the aircraft to a position where an attack on the target may be accomplished.

Obviously many modifications and variations of the present invention are possible in light of the above teachings. It is therefore to be understood that within the scope of the appended claims the invention may be practiced otherwise than as specifically described.

We claim:

1. In a graphic recording system including a two stylus moving strip chart recorder, apparatus comprising: a first mechanical cursor mounted on said recorder to span said strip chart for sliding movement therealong, second and third mechanical cursors each mounted on said recorder to span a portion of said chart for sliding movement therealong with respect to said first cursor, first and second electromechanical transducing means, means applying energizing voltages to said transducing means, mechanically coupling said first transducing means to said first and second cursors whereby said first transducing means provides an output voltage which varies in accordance with the displacement between said first and second cursors, means mechanically coupling said second transducing means to said first and third cursors whereby said second transducing means provides an output voltage which varies in accordance with the displacement between said first and third cursors, first and second output terminal means, and circuit means respectively coupling the output voltages of said first and second transducing means to said first and second output terminal means.

2. In a graphic recording system including a two stylus moving strip chart recorder, apparatus comprising: a first mechanical cursor mounted on said recorder to span said strip chart for sliding movement therealong, second and third mechanical cursors each mounted on said recorder to span a portion of said chart for sliding movement therealong with respect to said first cursor, first and second potentiometers having the resistive portions thereof mechanically coupled to said first cursor for translation with respect to the wipers thereof, means mechanically coupling the wipers of said first and second potentiometers respectively to said second and third cursors for translation with respect to the resistive portions thereof, means applying voltages to the resistive portions of said potentiometers, and output terminal means coupled to the wipers of said potentiometers.

3. In a sonobuoy data processing system including a two stylus moving strip chart recorder having the stylus actuating mechanisms thereof coupled to the output circuits of a two channel sonobuoy receiving system, read-out and computing apparatus comprising: a first mechanical cursor mounted on said recorder to span said strip chart for sliding movement therealong, second and third mechanical cursors each mounted on said recorder to span a portion of said chart for sliding movement therealong with respect to said first cursor, first and second electromechanical transducing means, means applying energizing voltages proportional to the velocity of sound in water to said transducing means, means mechanically coupling said first transducing means to said first and second cursors whereby said first transducing means provides an output voltage which varies in accordance with the displacement between said first and second cursors, means mechanically coupling said second transducing means to said first and third cursors whereby said second transducing means provides an output voltage which varies in accordance with the displacement between said first and third cursors, first and second output terminal means, and circuit means respectively coupling the output voltages of said first and second transducing means to said first and second output terminal means.

4. In a sonobuoy data processing system including a two stylus moving strip chart recorder having the stylus actuating mechanisms thereof coupled to the output circuits of a two-channel sonobuoy receiving systems, read-out and computing apparatus comprising: a first mechanical cursor mounted on said recorder to span said strip chart for sliding movement therealong, second and third mechanical cursors each mounted on said recorder to span a portion of said chart for sliding movement therealong with respect to said first cursor, first and second potentiometers having the resistive portions thereof mechanically coupled to said first cursor for translation with respect to the wipers thereof, means mechanically coupling the wipers of said first and second potentiometers respectively to said second and third cursors for translation with respect to the resistive portions thereof, means applying voltages proportional to the velocity of sound in water to the resistive portions of said potentiometers, and output terminal means coupled to the wipers of said potentiometers.

5. In a sonobuoy data processing system including a two stylus moving strip chart recorder having the stylus actuating mechanisms thereof coupled to the output circuits of a two channel sonobuoy receiving systems, read-out and computing apparatus comprising: a first mechanical cursor mounted on said recorder to span said strip chart for sliding movement therealong, second and third mechanical cursors each mounted on said recorder to span a portion of said chart for sliding movement therealong with respect to said first cursor, first and second electromechanical transducing means, means applying an energizing voltage proportional to the velocity of sound in water to one of said transducing means, means applying on energizing voltage proportional to one-half the velocity of sound in water to the other of said transducing means, means mechanically coupling said first transducing means to said first and second cursors whereby said first transducing means provides an output voltage which varies in accordance with the displacement between said first and second cursors, means mechanically coupling said second transducing means to said first and third cursors whereby said second transducing means provides an output voltage which varies in accordance with the displacement between said first and third cursors, a pair of output terminal means, circuit means coupling the output voltage of one of said transducing means to one of said output terminal means, circuit means coupling the output voltages of said first and second transducing means in opposition to the other of said output terminal means.

6. In a sonobuoy data processing system including a two stylus moving strip chart recorder having the stylus actuating mechanisms thereof coupled to the output circuits of a two-channel sonobuoy receiving system, read-out and computing apparatus comprising: a first mechanical cursor mounted on said recorder to span said strip chart for sliding movement therealong, second and third mechanical cursors each mounted on said recorder to span a portion of said chart for sliding movement therealong with respect to said first cursor, first and second potentiometers having the resistive portions thereof mechanically coupled to said first cursor for translation with respect to the wipers thereof, means mechanically coupling the wipers of said first and second potentiometers respectively to said second and third cursors for translation with respect to the resistive portions thereof, means applying a voltage proportional to the velocity of sound in water to the resistive portion of one of said potentiometers, means applying a voltage proportional to one-half the velocity of sound in water to the resistive portion of the other of said potentiometers, a pair of output terminal means, circuit means coupling the voltage appearing at the wiper of one of said potentiometers to one of said output terminal means, circuit means coupling the voltages appearing at the wipers of said potentiometers in opposition to the other of said output terminal means.

7. In a sonobuoy data processing system including a two stylus moving strip chart recorder having the stylus actuating mechanisms thereof coupled to the output circuits of a two channel sonobuoy receiving system, read-out and computing apparatus comprising: a first mechanical cursor mounted on said recorder to span said strip chart for sliding movement therealong, second and third mechanical cursors each mounted on said recorder to span a portion of said chart for sliding movement therealong with respect to said first cursor, first and second electromechanical transducing means, means applying an energizing voltage proportional to the velocity of sound in water to one of said transducing means, means applying an energizing voltage proportional to one-half the velocity of sound in water to the other of said transducing means, means mechanically coupling said first transducing means to said first and second cursors whereby said first transducing means provides an output voltage which varies in accordance with the displacement between said first and second cursors, means mechanically coupling said second transducing means to said first and third cursors whereby said second transducing means provides an output voltage which varies in accordance with the displacement between said first and third cursors, a pair of output terminal means, circuit means coupling the output voltage of one of said transducing means to one of said output terminal means, circuit means coupling the output voltages of said first and second transducing means in opposition to the other of said output terminal means, and means to apply a voltage proportional to a reference base line to the other of said output terminal means.

8. In a sonobuoy data processing system including a two stylus moving strip chart recorder having the stylus actuating mechanisms thereof coupled to the output circuits of a two-channel sonobuoy receiving system, read-out and computing apparatus comprising: a first mechanical cursor mounted on said recorder to span said strip chart for sliding movement therealong, second and third mechanical cursors each mounted on said recorder to span a portion of said chart for sliding movement therealong with respect to said first cursor, first and second potentiometers having the resistive portions thereof mechanically coupled to said first cursor for translation with respect to the wipers thereof, means mechanically coupling the wipers of said first and second potentiometers respectively to said second and third cursors for translation with respect to the resistive portions thereof, means applying a voltage proportional to the velocity of sound in water to the resistive portion of one of said potentiometers, means applying a voltage proportional to one-half the velocity of sound in water to the resistive portion of the other of said potentiometers, a pair of output terminal means, circuit means coupling the voltage appearing at the wiper of one of said potentiometers to one of said output terminal means, circuit means coupling the voltages appearing at the wipers of said potentiometers in opposition to the other of said output terminal means, and means to apply a voltage proportional to a reference base line to the other of said output terminal means.

9. In a sonobuoy data processing system including a two stylus moving strip chart recorder having the stylus actuating mechanisms thereof coupled to the output circuits of a two channel sonobuoy receiving system, read-out and computing apparatus comprising: a first mechanical cursor mounted on said recorder to span said strip chart for sliding movement therealong, second and third mechanical cursors each mounted on said recorder to span a portion of said chart for sliding movement therealong with respect to said first cursor, first and second electromechanical transducing means, means applying an energizing voltage proportional to the velocity of sound in water to one of said transducing means, means applying an energizing voltage proportional to one-half the velocity of sound in water to the other of said transducing means, means mechanically coupling said first transducing means to said first and second cursors whereby said first transducing means provides an output voltage which varies in accordance with the displacement between said first and second cursors, means mechanically coupling said second transducing means to said first and third cursors whereby said second transducing means provides an output voltage which varies in accordance with the displacement between said first and third cursors, a pair of output terminal means, circuit means coupling the output voltage of one of said transducing means to one of said output terminal means, circuit means coupling the output voltages of said first and second transducing means in opposition to the other of said output terminal means, means to apply a voltage proportional to a reference base line to the other of said output terminal means, counter means, circuit means coupling said counter means to said pair of output terminal means, and signalling circuit means coupled to said indicating means.

10. In a sonobuoy data processing system including a two stylus moving strip chart recorder having the stylus actuating mechanisms thereof coupled to the output circuits of a two-channel sonobuoy receiving system, read-out and computing apparatus comprising: a first mechanical cursor mounted on said recorder to span said strip chart for sliding movement therealong, second and third mechanical cursors each mounted on said recorder to span a portion of said chart for sliding movement therealong with respect to said first cursor, first and second potentiometers having the resistive portions thereof mechanically coupled to said first cursor for translation with respect to the wipers thereof, means mechanically coupling the wipers of said first and second potentiometers respectively to said second and third cursors for translation with respect to the resistive portions thereof, means applying a voltage proportional to the velocity of sound in water to the resistive portion of one of said potentiometers, means applying a voltage proportional to one-half the velocity of sound in water to the resistive portion of the other of said potentiometers, a pair of output terminal means, circuit means coupling the voltages appearing at the wiper of one of said potentiometers to one of said output terminal means, circuit means coupling the voltages appearing at the wipers of said potentiometers in opposition to the other of said output terminal means, means to apply a voltage proportional to a reference baseline to the other of said output terminal means, counter means, indicating means, circuit means coupling said counter means to said pair of output terminal means, and signalling circuit means coupled to said indicating means.

UNITED STATES PATENT OFFICE
CERTIFICATE OF CORRECTION

Patent No. 3,571,786                Dated March 23, 1971

Inventor(s) Donald M. Saling et al

It is certified that error appears in the above-identified patent and that said Letters Patent are hereby corrected as shown below:

At the top of the drawing "Mureay" should read -- Murray --.
Column 10, line 52, before "circuit" insert -- indicating means, -

Signed and sealed this 2nd day of November 1971.

(SEAL)
Attest:

EDWARD M. FLETCHER, JR.          ROBERT GOTTSCHALK
Attesting Officer                 Acting Commissioner of Patent